May 25, 1965 R. L. SMIRL 3,185,273
HYDRAULIC COUPLING WITH LOCK-UP CLUTCH
Filed Jan. 17, 1963 2 Sheets-Sheet 1
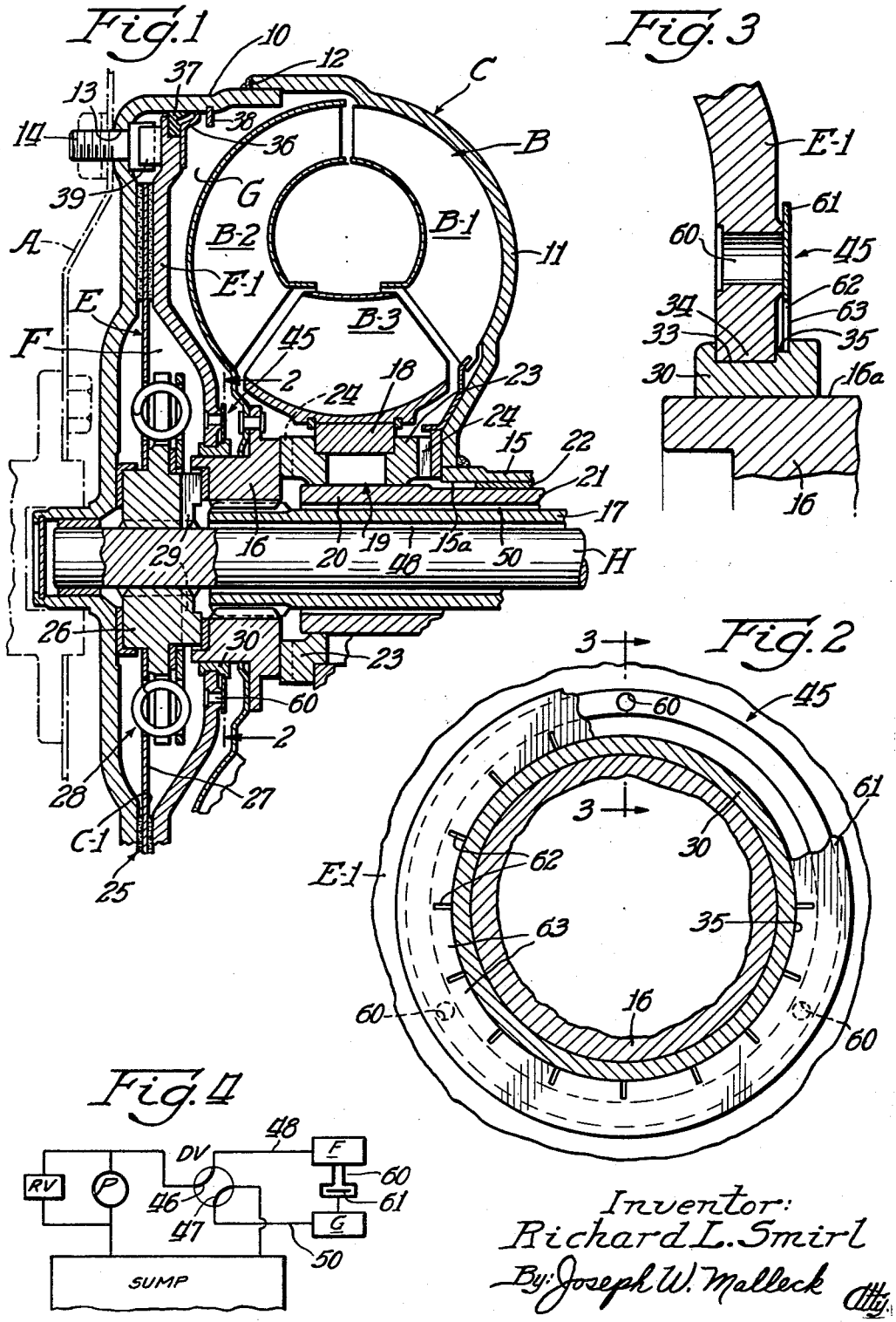
Inventor:
Richard L. Smirl
By: Joseph W. Malleck Atty

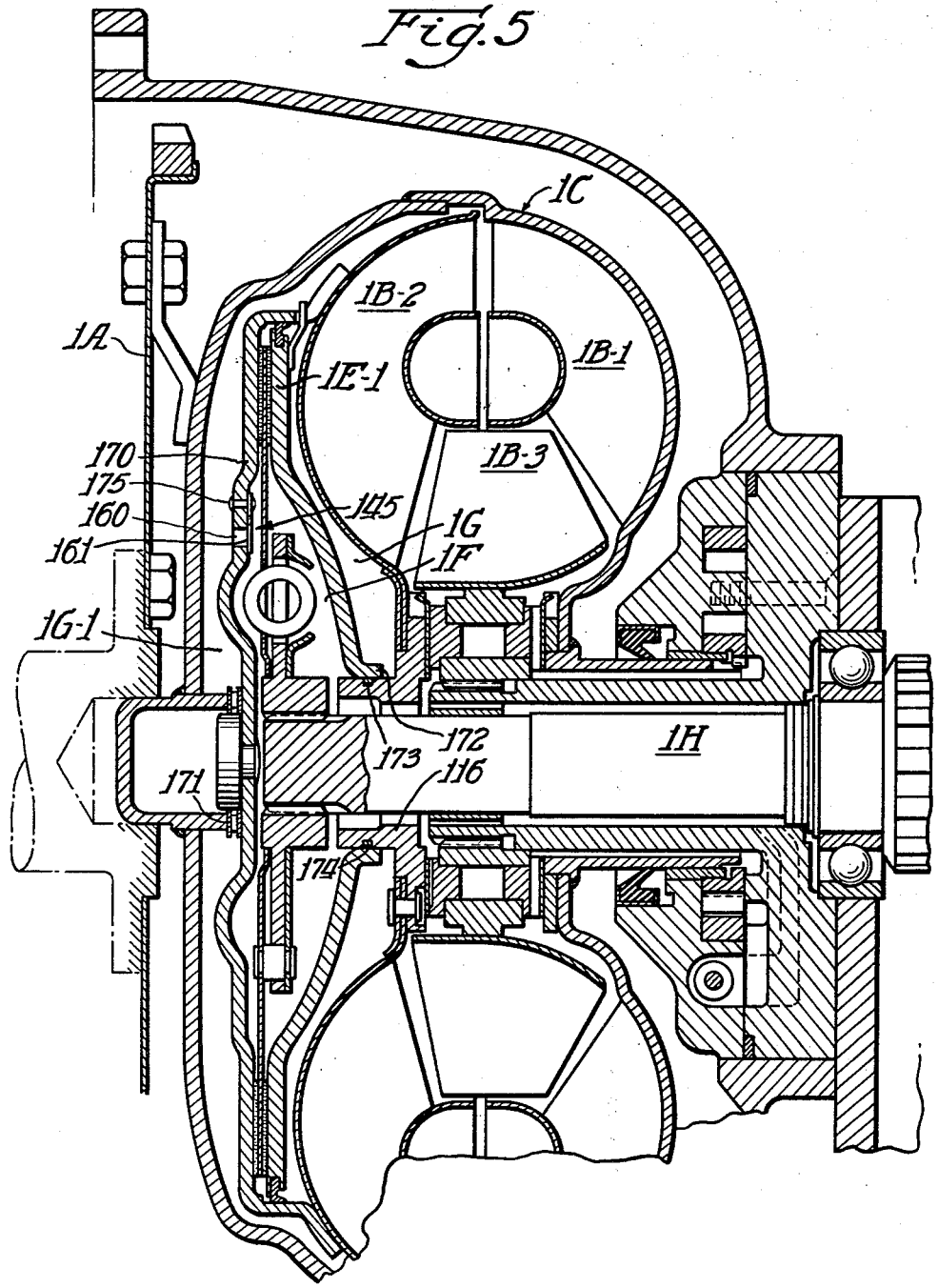

3,185,273
HYDRAULIC COUPLING WITH LOCK-UP CLUTCH
Richard L. Smirl, La Grange Park, Ill., assignor to Borg-Warner Corporation, Chicago, Ill., a corporation of Illinois
Filed Jan. 17, 1963, Ser. No. 252,077
11 Claims. (Cl. 192—3.2)

This invention relates to hydraulic coupling devices and more particularly to a torque converter assembly associated with a hydraulically actuated friction clutch for transmission of power.

This application is a continuation-in-part of U.S. application Serial Number 799,239, filed March 13, 1959, which is now abandoned, which in turn was a continuation-in-part of U.S. application Serial Number 791,394, filed February 5, 1959, and which is now abandoned.

A primary object of this invention is to provide an improved hydraulic coupling device associated with the hydraulically actuated clutch for transmission of power, the device being more economical to produce than earlier devices of comparable function, and which utilizes significantly simpler hydraulic circuitry and components than the earlier devices.

Another object is to provide a hydraulic coupling device associated with a hydraulically actuated friction device, each being operated by the same fluid source and fluid circuit. A particular feature of this object is the provision of a rotatable housing for the devices including a coupling chamber and a friction clutch chamber; the devices have a pressure control system adapted to selectively transmit fluid to one of the chambers and then to the other chamber, the system being particularly characterized by the provision of at least one uni-directional valve disposed in the wall separating said chambers and affording fluid communication therebetween in a manner so that fluid flow or blockage of flow between said chambers affords operation of said clutch assembly.

Another object of this invention is the provision of a torque converter assembly utilizing a lock-up clutch device, the converter and clutch each being operated by one hydraulic circuit which is adapted to include passage of fluid between the walls defining a clutch chamber and the converter chamber, the wall separation being provided with uni-directional valve means adapted to affect desired fluid communication to operate the clutch by said fluid circuit.

Yet another object of this invention is to provide a torque converter assembly including a disconnect clutch, the clutch and converter being operated by one hydraulic circuit.

A more specific object of this invention is a provision of a hydraulic coupling device including a hydraulically actuated friction clutch both operated by the same hydraulic circuit passing directly between the operating chambers of said clutch and converter, said wall separating said chambers being provided with a plurality of openings therein each controlled by a one-way valve means mounted thereacross, the one-way valve means comprising an annular reed-type plate provided with flexible tangs associated with each of the openings so as to permit fluid to flow in one direction and prevent fluid flow in the opposite direction.

Other objects and features of the invention will be readily apparent to those skilled in the art from the specification and appended drawings illustrating certain preferred embodiments in which:

FIG. 1 is a central fragmentary sectional view of a torque converter assembly and lock-up clutch incorporating the principle of this invention;

FIG. 2 is an enlarged fragmentary sectional view taken substantially along line 2—2 of FIG. 1 and illustrating the plan view of the annular reed-type one-way valve means;

FIG. 3 is a greatly enlarged fragmentary sectional view taken substantially along line 3—3 of FIG. 2; and FIG. 4 is a schematic view of a hydraulic control system for the converter assembly of FIG. 1;

FIG. 5 is a fragmentary central sectional view of a torque converter assembly including disconnect clutch, and illustrating still another embodiment of this invention.

Turning now more specifically to the drawings and particularly to the FIGS. 1-3, which illustrate a preferred embodiment of the type having a torque converter associated with a lock-up clutch device for alternatively transmitting power through the converter or directly through the clutch and thereby bypassing the converter. The torque converter device of FIG. 1 broadly comprises an input and output means shown respectively as flywheel A and shaft H, a rotatable housing C integrally connected to the input means and which is adapted to enclose both the converter elements and the clutch assembly. The torque converter B is of conventional construction and comprises an impeller B-1 drivingly connected to the housing, a turbine B-2 and a stator B-3. The clutch assembly E is also disposed within housing C and is provided with a piston member E-1 which cooperates in dividing the interior of the housing C into a clutch chamber F and a converter chamber G.

Turning more specifically to the components thereof, the driving housing C comprises a forward cylindrical portion 10 and rearward cylindrical portion 11 each connected together, here shown by welding 12. The forward portion 10 is provided with a plurality of opening 13 through which extend the shanks of fasteners 14 adapted for connection to a conventional fly-wheel A. The rearward portion 11 has a semi-toroidal portion which forms part of the impeller B-1. The radially innermost periphery of the semi-toroidal portion of the housing is connected to an impeller shaft 15 which may in turn be connected in conventional fashion to an oil pump (not shown).

The turbine B-2 is mounted on annular hub 16, splined to a turbine shaft 17 which is concentrically disposed within the impeller shaft 15 and is connected to suitable gearing of a transmission (not shown).

The stator B-3 of the converter is mounted on an annular race 18 of a one-way engaging device 19. This one-way device may, if desired, be of the general type described in detail in U.S. Patent 2,824,636, issued to Harry P. Troendly et al., and assigned to the assignee of this invention. An inner race 20 is provided for the one-way device and comprises one end portion of a stator shaft 21 concentrically disposed between the turbine shaft 17 and the impeller shaft 15. Suitable bearings 22 are disposed between the various concentrically disposed shafts for maintaining proper alignment and independent rotation of each; annular being blocks 23 are also provided between the ends of the races 18 and 20 and the respectively adjacent hub 16 and impeller shaft end 15a. The bearings 23 in addition are provided with openings 24 extending radially therethrough to provide passage-ways for oil to flow, described in detail later.

The clutch assembly E employs an annular driven clutch plate 25 which is adapted for a driving connection to the central output shaft H concentrically disposed in turbine sleeve shaft 17. Clutch engagement is provided when piston E-1 grips the plate between it and an annular surface C-1 of the housing. The clutch plate in particular comprises a hub 26 splined to the output shaft H and has a disc 27 carried on the hub by vibration dampener assembly 28 which may, if desired, be of the general type described in U.S. Patent 2,841,262, issued on July 1, 1958, assigned to the assignee of this invention. The hub 26 is provided with a plurality of grooves 29 extending radially therethrough to provide passage-ways for oil flow, as discussed in detail hereafter.

Turning now more specifically to the piston E-1 (FIG. 3), it is mounted for movement upon an annular bearing 30 which in turn is mounted upon a radially outer cylindrical portion 16a of the hub 16 serving also to mount the turbine B-2. Bearing 30 is adapted for sliding movement thereon and has a radially outer cylindrical portion provided with an annular groove 33 in which is disposed the radially inner periphery or portion 34 of the annular piston E-1. The groove of the bearing is formed so that the piston will be seated therein and prevented from relative movement therewith. The groove 34 also has a stepped portion 35 adapted to receive an annular flexible member therein which will be described hereinafter. The radially outer periphery of the piston E-1 has mounted thereon an annular metal seal support 36 which carries a rubber-like seal ring 37 adapted to maintain engagement with the adjacent portion of the housing to prevent fluid flow past the piston E-1. A snap ring 38, disposed in a suitable groove on the inner surface of the forward housing portion 10 is provided to serve as an abutment limiting movement of the piston during the disengaged phase of operation. The piston E-1 is also provided with a plurality of lugs 39 which are received within heads of studs 14 and serve, together with the heads of the studs 14, to insure a driving connection between the forward portion of the housing and the piston E-1.

As best shown in FIG. 1, the piston cooperates with the bearing 30 and seal ring 37 in dividing the interior of the housing into chambers F and G. Fluid communication means 45 is provided in the piston of this embodiment to enable fluid introduced into one of the chambers to be employed for actuation of the clutch device or of the converter depending upon which chamber the fluid is introduced. With such construction it is possible to obtain all of the advantages of a torque converter with a lock-up clutch utilizing, however, only a single relief valve for pressure regulation; this is a distinct advantage over prior art constructions which required more complex and expensive hydraulic circuitry. When engine oil is utilized the need for the extra pump and pressure relief valve is completely obviated. In other words it is merely necessary to provide with the aforementioned construction a single pump (or use of the engine oil pump) which would be in series with a directional valve which would in turn supply in a manner to be discussed, fluid either to the converter chamber G or to the clutch plate chamber F.

Assuming that it is desired to obtain the disengaged condition of the lock-up clutch while charging the converter for hydraulic drive therethrough (and referring specifically to FIG. 4 wherein is diagrammatically shown a typical hydraulic circuit for operating the converter assembly), the hydraulic circuitry comprises a pump P for drawing fluid from a sump to provide a supply line pressure maintained at a predeterminel level by a relief valve RV. The supply line pressure is transmitted to chamber F by directional selection of a directional valve DV. This directional valve is illustrated as being of the rotary type and has arcuate channels 46 and 47. In the position illustrated, the supply line pressure may flow through the channel 46 and thence through passageway 48 provided between the output shaft H and the turbine sleeve shaft 17. The supply line pressure then passes radially outwardly through grooves 29 provided in the clutch plate hub and thereby fill the clutch chamber F with the supply pressure. The presence of a supply line pressure in chamber F will react against the piston E-1 to urge it to the right (FIG. 1) and disengage it from the clutch disc 25. The supply line pressure within chamber F is then permitted to pass through fluid communication means 45 provided in the piston E-1 and thence into converter chamber G. The fluid flow through the fluid communication means provides a pressure drop therebetween; oil or fluid passing through means 45 would flow around the outside of the turbine B-2 into the fluid circuit on the inside of the converter and pass out of the converter through the radially disposed openings 24 which in turn are in communication with passageway 50 provided between the turbine shaft 17 and the stator shaft 21. The restricted nature of the openings 24 and the passageway 50 insures the maintenance of the converter pressure. This pressure is sufficiently below the supply line pressure to maintain the desired circulation through the converter and sufficiently high to charge the converter properly for operation. During this condition, the supply line to the converter through the passageway 50 (provided between the impeller and stator shafts) is closed off by virtue of the position of the rotary valve DV.

Should direct drive be desired by engagement of the clutch assembly as well as maintenance of sufficient pressure in the converter to maintain it full of fluid for immediate response, the chamber G is pressurized with line pressure. This is accomplished by a movement of the rotary valve DV 90° to a position in which communication is afforded between the pump outlet and the passageway 50. It will be noted that the rotary valve may be rotated in either direction to bring the passageways 46 and 47 into register with the pump outlet. As the converter or chamber G is pressurized, the fluid communication means 45 is closed by such pressure to prevent fluid flow through the piston. At the same time the pressure in the converter chamber G urges the piston against the clutch disc to grip it in cooperation with the annular surface C-1 of the housing. The fluid circuit is complete by virtue of rotation of the valve which brings passageway 50 into communication with the return to sump (by way of the openings 24 disposed adjacent to the outlet of the turbine). Passageway 50 is of a restricted nature to maintain sufficient pressure within the chamber G under such condition. If engine oil is utilized the sump and pressure relief valve may be eliminated and the engine oil may be fed directly to the directional valve. Since the engine has its own sump, an additional sump, such as that illustrated, would not be required.

Turning now more particularly to the fluid communication means 45 which enables the unitary hydraulic circuit to be used with this invention, it comprises one or more openings 60 provided in the piston E-1; the openings are preferably arranged in an annular circumferentially spaced configuration so that a reed-type valve member 61 may be employed to control fluid flow therethrough. The annular valve member, as shown in FIG. 2, has a plurality of circumferentially spaced slots 62 extending radially outwardly from the inner periphery thereof. The slots do not extend through the entire transverse extent of the member, so that flexible tangs 63 are formed thereby. The inner annular marginal portion of the tangs are carried upon the stepped portion 35 of the annular groove 33 of bearing 30. Together, the stepped portion of the bearings 30 and the adjacent inner periphery of the piston E-1 constrain the inner margin of the valve member against movement parallel to the axis of rotation of the clutch. The tang portions give a resiliency of the valve member so that the outer margin thereof, which is in general alignment with the openings of the piston, may flex to promote a unidirectional control of fluid therethrough. When fluid pressure is greatest within the clutch plate chamber F, fluid tends to exert a force (to the right in FIG. 1) to flex the annular valve member outwardly permitted in such direction. However, when the higher pressure is disposed within the converter chamber G, the fluid pressure tends to force the annular valve member against the piston E-1 closing off the opening therein. To promote such unidirectional valve operation, the area around each of the openings is coined to form an annular land approximately 0.010 inch high for the outer portion of the valve member to set thereagainst.

In FIG. 5, an alternative embodiment is illustrated wherein a disconnect clutch is operated by the singular hydraulic circuit, but in a rearranged condition. Similar parts of this embodiment to that of the preferred embodiment are indicated by similar numbers prefixed by the numeral "1." The construction herein is substantially similar to that of the preferred embodiment except that the clutch plate chamber F is now defined by a turbine plate 170 fixed to the turbine 1B–2 instead of by the forward portion of the housing 1C; the plate has an inner periphery maintained in proper alignment with the housing 1C by suitable bearings 171. The piston 1E–1 again serves to substantially divide the housing interior into chambers 1F and 1G, but the chamber 1G now is adapted to surround the clutch plate chamber since there is a chamber portion 1G–1 which is forward of the clutch plate chamber. The piston 1E–1, instead of having an independent bearing, has an inner periphery provided with outwardly deterred annular flange 172 adapted for sliding movement on the turbine bearing 116; a sealing relation is maintained between such sliding parts by seal means 173 disposed in annular groove 174 of the bearing 116.

Fluid communication means 145 is now disposed within the turbine plate 170 and again comprises one or more circumferentially spaced openings 160. The fluid flow through each of the openings is controlled by a reed-type valve member 161 having one portion securely fastened to the turbine plate by suitable fastening means such as rivet 175. The valve member has appropriate tang portion 163 adapted for flexure and to provide one-way fluid control of the opening 160.

The hydraulic apparatus used in FIG. 4 can be equally applied to the alternative embodiment except that the fluid communication means 145 is reversed in direction of operation. Assuming that it is desired to operate the converter and transmit power to the transmission (not shown), the disconnect clutch must be engaged. To do so, the rotary valve RV is moved to a position whereby line pressure is placed in communication with the converter chamber 1G. Fluid pressure therein is then transmitted to the remote portion 1G–1 of chamber 1G and permitted, by a one-way fluid means 145, to enter the clutch plate chamber 1F whereby it is permitted to drain outwardly back to sump. The pressure in the cluch plate chamber 1F will be less than that in chamber 1G due to a pressure drop occurring through the openings 160 in the turbine plate 170. Thus, the higher pressure contained in chamber 1G will urge the piston 1E–1 into engagement with the clutch plate for transmitting drive to the output shaft 1H. To disconnect the converter from the output shaft and provide a stoppage of power transmission therethrough, the clutch must be disengaged. To do so the rotary valve 1DV is moved to a 90° position therefrom communicating line pressure with the clutch plate chamber 1F. At this point no line pressure is permitted to enter the converter chamber 1G. The higher pressure within the clutch plate chamber 1F will urge the piston 1E–1 out of engagement with the clutch plate and provide positive clutch disengagement. In this condition the one-way valve means 145 is closed by virtue of its one-way action and does not permit fluid pressure to be supplied to the converter chamber G.

It can be appreciated from the foregoing description of the embodiments, that the invention provides for the utilization of an extremely simple hydraulic circuitry associated therewith. Further, when high pressure fluid is supplied to the converter chamber G in the lock-up clutch installation, there is very little fluid flow necessary to fill the converter and operate the converter chamber G or 1G which therefore permits other circuits to be supplied from the pump at the same time while inherently reducing the pump delivery load. It should additionally be noted that these advantages are achieved by the very simple and inexpensive provision of openings in the piston (or in the turbine plate of the latter embodiment). By these arrangements, just one pressure may be utilized for charging the converter and for releasing the clutch in the low range of the converter for the preferred embodiment, or for charging the converter and engaging the clutch in the latter embodiment.

While I have described my invention in connection with certain specific constructions and embodiments, it is to be understood that this is by way of illustration and not by way of limitation and the scope of my invention is defined solely by the appended claims which should be construed as broadly as the prior art will permit.

I claim:

1. A transmission device, comprising: input and output means, a housing drivingly connected to said input means and defining a chamber, a hydraulic coupling device disposed within said housing chamber and having elements comprising at least a rotatable impeller being drivingly connected to said housing and a rotatable turbine, and means defining a clutch assembly adapted to connect one of said elements with said output means, said clutch assembly having walls defining a clutch plate chamber in said housing and including a piston movable in response to fluid pressure in said housing chamber, a source of fluid pressure, means defining a hydraulic control system communicating said clutch chamber, housing chamber and fluid source in a series arrangement and forming a complete circuit therewith, said system being particularly characterized by the inclusion of at least one uni-directional valve means disposed in said circuit and adapted so that fluid may flow from said source in one direction of the circuit to effect one operational condition of said clutch while charging said coupling device and adapted to prevent fluid flow in an opposite direction of said circuit to effect another operational condition of said clutch assembly.

2. A control system for a torque converter assembly having input and output means, a torque converter having at least one element drivingly connected to said input means, and a lock-up clutch means effective to connect another element of said torque converter with said output means and comprising a fluid pressure chamber and a pressure plate effective to exert frictional thrust to engage said clutch means and being movable into a disengaged condition in response to fluid pressure in said chamber and movable into an engaged condition in response to fluid pressure in said torque converter, comprising: means defining a source of fluid under a predetermined pressure, valve means communicating said fluid source with each of said chamber and torque converter and effective to selectively divert said fluid into said clutch chamber or into said converter, and means affording uni-directional communication between said chamber and said converter to complete a fluid circuit whereby when said fluid pressure is introduced into one of said chamber or converter, the fluid pressure may exit from the other of said chamber or converter so as to operate both said clutch means and said converter from the same fluid source.

3. A control system for a torque converter assembly having input and output means, a torque converter having a plurality of elements with an element drivingly connected to said input means, and a lock-up clutch means effective to connect one of said torque converter elements with said output means and comprising a fluid pressure chamber and a pressure plate effective to exert frictional thrust to promote engagement of said clutch means and being movable into disengaged position by fluid received in said chamber and movable into engaged position by fluid received in said converter, comprising: a source of fluid under a predetermined pressure, valve means for selectively diverting said fluid into said chamber or into said converter, and means affording fluid communication between said chamber and said converter with an accompanying pressure drop therebetween when pressure fluid is introduced into said chamber, and means responsive to fluid first introduced into said converter for preventing fluid communication between said converter and said chamber.

4. A control system as in claim 3 in which said last named fluid communication means more particularly includes a plurality of openings in said pressure plate, resilient portions mounted on said pressure plate adapted to cover each of said openings whereby fluid flow may cause flexure of said portions away from said pressure plate when flowing in one direction and urge said portions against said pressure plate when fluid flow is directed in an opposite direction.

5. A torque converter assembly having a housing, a lock-up clutch assembly including an annular pressure plate having an inner and outer periphery and being disposed within said housing to divide the interior thereof into first and second chambers, an impeller mounted in said second chamber and directly connected to said housing, a fixed reaction sleeve, a stator mounted in said second chamber and overrunningly connected to said reaction sleeve, an output sleeve shaft, a hub fixed to said sleeve shaft, a turbine mounted in said second chamber and drivingly connected to said hub, a bearing slidably mounted on said hub, said bearing having at the outer periphery thereof a radially inwardly extending groove in the inner periphery of said pressure plate for reception of the inner periphery of said pressure plate, said groove having an annular stepped portion providing an annular shoulder, a clutch plate positioned in said first chamber, an output shaft for rotatably mounting said clutch plate and being disposed concentrically within said sleeve shaft, the improvement comprising a control system for selectively feeding fluid into said first chamber to disengage said clutch and thence into said second chamber for charging the converter at low speed range or feeding fluid at a high torque converter speed range directly into said second chamber for simultaneously charging said converter and for actuating said pressure plate to engage said clutch, said control system including a uni-directional valve affording fluid communication between said first chamber and said second chamber in the low range and preventing fluid communication between said second chamber and said first chamber in the high range, said uni-directional valve comprising a plurality of circumferentially spaced openings in said pressure plate to provide a pressure drop therebetween, an annular flexible disc mounted on said stepped portion and having an inner periphery disposed against said annular shoulder, said disc having a plurality of circumferentially spaced slots extending radially outwardly from the inner periphery thereof, said disc being flexed by fluid flow from said first chamber to uncover said openings and return to a non-flexed condition upon pressurization of said second chamber to close off said openings.

6. A control system for a torque converter assembly having input and output means, a torque converter having a plurality of elements with at least one element drivingly connected to said input means, a hydraulically operated disconnect clutch means effective to connect another of said elements of said torque converter with said output means and having a fluid pressure chamber and a pressure plate effective to exert thrust to promote engagement of said clutch means and said pressure plate being movable into an engaged position by fluid pressure first received in said converter and movable into a disengaged condition by fluid first received in said chamber, comprising: a source of fluid under a predetermined pressure, valve means connecting said fluid source with each of said chamber and torque converter and effective to selectively divert said fluid into said chamber or into said converter, and means affording fluid communication between said chamber and said converter when fluid pressure is introduced to said converter to provide a pressure drop thereacross, and means responsive to a selectively higher pressure in said clutch chamber for preventing fluid communication between said converter and said chamber when introduced into said chamber.

7. In a torque convertor assembly having a housing, a lock-up clutch assembly including a pressure plate slidably mounted in said housing and dividing the interior of said housing into a first chamber and a second chamber, an impeller mounted in said second chamber and drivingly connected to said housing, a fixed reaction sleeve, a stator mounted in said second chamber and overrunningly connected to said reaction sleeve, an output sleeve shaft, a turbine mounted in said second chamber and connected to said sleeve shaft, said clutch assembly including a clutch plate positioned in said first chamber, a shaft for rotatively mounting said clutch plate concentric with said reaction sleeve and said sleeve shaft, the improvement comprising a control system for feeding fluid into said first chamber to disengage said clutch and thence into said second chamber for charging the convertor at low speed range and for feeding fluid at a high torque converter speed range directly into said second chamber to engage said clutch, said control system including a plurality of openings in said pressure plate and valve means for closing said openings when the pressure in said second chamber exceeds the pressure in said first chamber, said valve means being adapted to be opened when fluid is fed into said first chamber to disengage said clutch, said second chamber being chargeable through said first chamber when the fluid pressure in said first chamber exceeds the fluid pressure in said second chamber.

8. A control system for a torque convertor assembly having input and output means, a torque converter having a plurality of elements with at least one element drivingly connected to said input means, a lock-up clutch means having a fluid pressure chamber and a pressure plate effective to exert thrust to promote engagement of said clutch means and having said pressure plate movable into disengaged position by fluid received in said chamber and into engaged position by fluid received in said convertor, comprising; a source of fluid under a predetermined pressure, valve means for selectively diverting said fluid into said chamber or into said convertor, and means affording fluid communication between said chamber and said convertor when pressure fluid is introduced into said chamber and for preventing fluid communication between said convertor and said chamber when pressure fluid is introduced into said convertor, said means including openings in said presure plate and valve means responsive to the relative pressures in said chamber and said convertor for effecting the uni-directional flow of fluid.

9. A hydraulic circuit for charging a torque convertor and operating a by-pass clutch of a convertor assembly having a housing; an axially movable pressure plate dividing the interior of said housing into a clutch chamber and a convertor chamber comprising; a source of fluid under pressure, a valve for selectively diverting said fluid into said clutch chamber or into said convertor chamber, restricted orifice means in said housing affording communication between said clutch chamber and said convertor chamber, valve means for preventing fluid communication between said convertor chamber and said clutch chamber when said convertor chamber is pressurized.

10. In a torque convertor assembly having a housing, a lock-up clutch assembly including a pressure plate slidably mounted in said housing and dividing the interior of said housing into a first chamber and a second chamber, an impeller mounted in said second chamber and drivingly connected to said housing, a fixed reaction sleeve, a stator mounted in said second chamber and overrunningly connected to said reaction sleeve, an output sleeve shaft, a hub affixed to said sleeve shaft, a turbine mounted in said second chamber and connected to said hub, a bearing mounted on said hub, said bearing having at the outer periphery thereof a radially inwardly extending groove for reception of the inner periphery of said pressure plate, a ledge formed in said groove, a radially outwardly extending ledge adjacent said first-named ledge, a clutch plate positioned in said first chamber, a shaft for rotatively mounting said clutch plate concentric with said reaction sleeve and said sleeve shaft, the improvement comprising a control system for feeding fluid into said first chamber to disengage said clutch and thence into said second chamber for charging the convertor at low speed range and for feeding fluid at a high torque converter speed range directly into said second chamber to engage said clutch, said control system including a uni-directional valve affording fluid communication between said first chamber and said second chamber in the low range and preventing fluid communication between said second chamber and said first chamber in the high range, said uni-directional valve comprising a plurality of circumferentially spaced openings in said pressure plate, an annular disc mounted on said first-named ledge, said disc having a plurality of circumferentially spaced slots extending radially outwardly from the inner periphery thereof, said disc being deflectable upon pressurization of said first chamber to uncover said openings and returnable upon pressurization of said second chamber to close off said openings.

11. A transmission device, comprising: input and output means, a housing drivingly connected to said input means and defining a chamber, a hydraulic coupling device disposed within said housing chamber and having elements comprising at least a rotatable impeller drivingly connected to said housing and a rotatable turbine, and means defining a clutch assembly adapted to connect one of said elements with said output means, said clutch assembly having walls defining a clutch plate chamber in said housing and including a piston movable in response to fluid pressure in said housing chamber, means defining a control system including a fluid pressure source and having means adapted to selectively transmit said fluid pressure to one of said chambers to effect one operational condition of said clutch assembly and further adapted to permit said fluid pressure to pass to the other of said chambers before returning to said pressure source, said system being particularly characterized by the inclusion of at least one uni-directional valve means adapted to permit fluid flow between said chambers to effect said first operational condition of said clutch assembly and adapted to prevent fluid flow in an opposite direction between said chambers to effect another operational condition of said clutch assembly when fluid pressure is selectively supplied first to the other of said chambers.

References Cited by the Examiner
UNITED STATES PATENTS

| | | | |
|---|---|---|---|
| 2,301,957 | 11/42 | Lang | 192—3.2 |
| 2,731,119 | 1/56 | Burdett et al. | 192—3.2 |
| 2,736,407 | 2/56 | Smirl | 192—3.2 |
| 2,793,726 | 5/57 | Jandasek | 192—3.2 |

DAVID J. WILLIAMOWSKY, *Primary Examiner.*